US012590183B2

(12) United States Patent
Kou et al.

(10) Patent No.: US 12,590,183 B2
(45) **Date of Patent: *Mar. 31, 2026**

(54) POLYALKYLENEIMINE-BASED POLYMERS CONTAINING POLYETHER CHAINS

(71) Applicant: BASF SE, Ludwigshafen am Rhein (DE)

(72) Inventors: Huiguang Kou, Ludwigshafen am Rhein (DE); Steffen Onclin, Ludwigshafen am Rhein (DE); Catharina Wohlmuth, Ludwigshafen am Rhein (DE); Ronald Ettl, Ludwigshafen am Rhein (DE); Eva-Maria Reis-Walther, Ludwigshafen am Rhein (DE); Clemens Auschra, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 824 days.

This patent is subject to a terminal disclaimer.

(21) Appl. No.: 17/761,342

(22) PCT Filed: Sep. 16, 2020

(86) PCT No.: PCT/EP2020/075836

§ 371 (c)(1),
(2) Date: Mar. 17, 2022

(87) PCT Pub. No.: WO2021/052998

PCT Pub. Date: Mar. 25, 2021

(65) Prior Publication Data

US 2022/0411582 A1 Dec. 29, 2022

(30) Foreign Application Priority Data

Sep. 20, 2019 (EP) .................................... 19198593

(51) Int. Cl.

| | |
|---|---|
| ***C08G 73/02*** | (2006.01) |
| ***C08K 3/04*** | (2006.01) |
| ***C09D 11/102*** | (2014.01) |
| ***C09D 179/02*** | (2006.01) |
| ***C09K 23/16*** | (2022.01) |
| ***C09K 23/42*** | (2022.01) |
| ***C09K 23/54*** | (2022.01) |

(52) U.S. Cl.

CPC ............ *C08G 73/0206* (2013.01); *C08K 3/04* (2013.01); *C09D 11/102* (2013.01); *C09D 179/02* (2013.01); *C09K 23/16* (2022.01); *C09K 23/42* (2022.01); *C09K 23/54* (2022.01)

(58) Field of Classification Search

None

See application file for complete search history.

(56) References Cited

U.S. PATENT DOCUMENTS

| | | | | |
|---|---|---|---|---|
| 6,777,530 | B1 * | 8/2004 | Meixner | C08G 73/0206 510/475 |
| 2010/0174046 | A1 * | 7/2010 | Liu | C09K 23/16 528/332 |
| 2016/0264731 | A1 | 9/2016 | Thetford et al. | |
| 2020/0230561 | A1 * | 7/2020 | Coulbeck | C08G 73/02 |

FOREIGN PATENT DOCUMENTS

| | | | | |
|---|---|---|---|---|
| EP | 2272893 | A1 * | 1/2011 | C08G 69/26 |
| JP | 09194585 | A * | 7/1997 | |
| WO | 92/13911 | A1 | 8/1992 | |
| WO | 2008/107326 | A1 | 9/2008 | |

OTHER PUBLICATIONS

JP-09194585-A, machine translation, 1997 (Year: 1997).*
International Preliminary Report on Patentability received for PCT Patent Application No. PCT/EP2020/075836, mailed on Mar. 31, 2022, 8 pages.
International Search Report and Written Opinion received for PCT Patent Application No. PCT/EP2020/075836, mailed on Dec. 1, 2020, 8 pages.

* cited by examiner

*Primary Examiner* — Satya B Sastri
(74) *Attorney, Agent, or Firm* — Faegre Drinker Biddle & Reath LLP

(57) ABSTRACT

The presently claimed invention relates to polyalkyleneimine-based polymers that are useful as dispersants and a process for the preparation thereof. The presently claimed invention is also directed to dispersants that are useful in solvent-based dispersion systems as well as in water-based dispersion systems.

16 Claims, No Drawings

POLYALKYLENEIMINE-BASED POLYMERS CONTAINING POLYETHER CHAINS

CROSS-REFERENCE TO RELATED APPLICATIONS

This application is a national stage application (under 35 U.S.C. § 371) of PCT/EP2020/075836, filed Sep. 16, 2020, which claims benefit of European Application No. 19198593.6, filed Sep. 20, 2019, both of which are incorporated herein by reference in their entirety.

FIELD OF THE INVENTION

The presently claimed invention relates to polyalkyleneimine-based polymers that are useful as dispersants and a process for the preparation thereof. The presently claimed invention is also directed to dispersants that are useful in solvent-based dispersion systems as well as in water-based dispersion systems.

BACKGROUND OF THE INVENTION

Dispersions containing solid dispersible particles, such as organic or inorganic pigments, are used for several different applications, e.g. as coating materials, for printing inks, colouring plastic materials, including fibres, glasses, or ceramic products, for formulations in cosmetics, or for the preparation of paint systems, in particular the automotive, industrial and decorative paints.

Dispersants assist the incorporation of solid materials such as pigments into a liquid vehicle by replacing the pigment-air interfaces with pigment-vehicle interfaces, thereby ensuring a uniform and stable dispersion. Dispersants also have a bearing on various process parameters involved in the preparation of dispersions such as the dispersion time and energy requirement.

A dispersant improves various dispersion properties such as millbase viscosity and rheology behavior. Improving the pigment concentration in a millbase is a critical challenge, which requires an effective dispersant. An enhanced rheology behaviour is characterized by suitable viscosities over a wide range of shear rates. An improvement in rheology behaviour leads to improved application properties, such as better flowability and levelling, less spattering and sagging of the coating.

A dispersant is also a determining factor of the aesthetics and physical properties of a coating. A dispersant can act as a flow control agent and bring about improved spreading of the composition over the surface of the substrate and improve the flow of the polymer film which forms in the course of curing, resulting in a smooth surface. Therefore, the dispersant reduces the formation of defects, known as craters, which are caused by impurities acting from the outside or by impurities on the surface of the substrate.

Due to environmental concerns, the use of aqueous vehicle-based dispersions as well as the organic vehicle-based dispersions having a high solids content are particularly preferred. Depending on the type and the polarity of the liquid phase, e.g. water, organic solvents or mixtures thereof, an appropriate polymeric dispersant is selected.

In view of the wide application of dispersions containing fine particulate solid materials and the important role played by the dispersants in their preparation, stability and properties, there is a growing need for improved dispersants that can assist the preparation of dispersions having the desired characteristics.

WO 1992/13911 A1 relates to an acetoacetanilide functionalized poly(alkylene glycol), which is prepared by reacting a poly(alkylene glycol) monoamine, diamine or triamine with isatoic anhydride followed by acetoacetylation of the resultant aminobenzamide. WO 1992/13911 A1 suggests that the acetoacetanilide functionalized poly(alkylene glycols be used for preparing the improved diarylide pigment compositions, which in turn are useful for preparing the storage stable printing inks, especially of the publication gravure type inks.

WO 2008/107326 A1 relates to poly(alkylene imine) grafted polymers of the acrylate, polyether or polyester type, which are useful as pigment dispersants.

Accordingly, it is an object of the presently claimed invention to provide dispersants having improved pigment affinity so that the dispersants provide millbases and/or paint compositions having improved rheology behaviour, as expressed by the viscosity at a given shear rate, and improved gloss and finishing of the surface coatings that are prepared by using the millbases and/or paint compositions. Further, it is desired that the dispersant can be used in solvent-based systems and in water-based systems.

SUMMARY OF THE INVENTION

Surprisingly, it was found that the polymers of the presently claimed invention which contain a polyalkyleneimine backbone, at least one aromatic moiety and at least one aliphatic polyether moiety are useful as dispersants having improved pigment affinity so that the dispersants provide millbases and/or paint compositions having improved rheology behaviour, as expressed by the viscosity at a given shear rate, and improved gloss and finishing of the surface coatings that are prepared by using the millbases and/or paint compositions. These dispersants have a high pigment affinity and they can be used in solvent-based systems as well as in water-based systems.

Accordingly, the main aspect of the presently claimed invention is directed to a polymer having a) a polyalkyleneimine backbone;
b) at least one aromatic moiety P.1, which is bound to a nitrogen atom of the polyalkyleneimine backbone via a carboxamide or a carboximide group; and
c) at least one aliphatic polyether moiety P.2, which is bound to a nitrogen atom of the polyalkyleneimine backbone.

In another aspect, the presently claimed invention provides a process for preparing the polymer. The process comprises the following steps, i. A polyalkyleneimine is reacted with an aromatic carboxylic acid or with an amide or imide forming derivative of an aromatic carboxylic acid, in such an amount that theoretically at most 90%, based on the total amount of primary and secondary nitrogen atoms of the polyalkyleneimine can be consumed.
ii. The product of step (i) is reacted with a first alkylene oxide and optionally with a second alkylene oxide to obtain the polymer.

In another aspect, the presently claimed invention provides a liquid composition in the form of a dispersion comprising a particulate solid material selected from the group consisting of pigments and fillers, and a liquid diluent; wherein the particulate solid material is dispersed in the liquid diluent which further comprises the polymer of the presently claimed invention.

DETAILED DESCRIPTION

Before the present compositions and formulations of the presently claimed invention are described, it is to be understood that this invention is not limited to particular compositions and formulations described, since such compositions and formulation may, of course, vary. It is also to be understood that the terminology used herein is not intended to be limiting, since the scope of the presently claimed invention will be limited only by the appended claims.

If hereinafter a group is defined to comprise at least a certain number of embodiments, this is meant to also encompass a group which preferably consists of these embodiments only. Furthermore, the terms 'first', 'second', 'third' or 'a', 'b', 'c', etc. and the like in the description and in the claims, are used for distinguishing between similar elements and not necessarily for describing a sequential or chronological order. It is to be understood that the terms so used are interchangeable under appropriate circumstances and that the embodiments of the presently claimed invention described herein are capable of operation in other sequences than described or illustrated herein. In case the terms 'first', 'second', 'third' or '(A)', '(B)' and '(C)' or '(a)', '(b)', '(c)', '(d)'etc. r'i', 'ii', etc. relate to steps of a method or use or assay there is no time or time interval coherence between the steps, that is, the steps may be carried out simultaneously or there may be time intervals of seconds, minutes, hours, days, weeks, months or even years between such steps, unless otherwise indicated in the application as set forth herein above or below.

Furthermore, the ranges defined throughout the specification include the end values as well, i.e. a range of 1 to 10 implies that both 1 and 10 are included in the range. For the avoidance of doubt, applicant shall be entitled to any equivalents according to applicable law.

In the following passages, different aspects of the presently claimed invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to 'one embodiment' or 'an embodiment' means that a particular feature, structure or characteristic described in connection with the embodiment is included in at least one embodiment of the presently claimed invention. Thus, appearances of the phrases 'in one embodiment' or 'in an embodiment' in various places throughout this specification are not necessarily all referring to the same embodiment, but may refer to the same embodiment. Further, as used in the following, the terms "preferably", "more preferably", "even more preferably", "most preferably" and "in particular" or similar terms are used in conjunction with optional features, without restricting alternative possibilities. Thus, features introduced by these terms are optional features and are not intended to restrict the scope of the claims in any way.

Furthermore, the particular features, structures or characteristics may be combined in any suitable manner, as would be apparent to a person skilled in the art from this disclosure, in one or more embodiments. Furthermore, while some embodiments described herein include some, but not other features included in other embodiments, combinations of features of different embodiments are meant to be within the scope of the presently claimed invention, and form different embodiments, as would be understood by those in the art. For example, in the appended claims, any of the claimed embodiments can be used in any combination.

Further, it shall be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once.

Surprisingly, the polymers of the presently claimed invention are found to be useful as dispersants. These dispersants have a high pigment affinity. A millbase prepared using the dispersant has a low millbase viscosity.

For preparing a dispersion containing a fine particulate solid material, such as a paint composition, the dispersant can be used in a solvent-based system as well as in a water-based system. The dispersion has a high stability and a low viscosity. The paint composition provides a surface coating with a high gloss and a low crater ranking.

Accordingly, the main aspect of the presently claimed invention is directed to a polymer having a) a polyalkyleneimine backbone;
b) at least one aromatic moiety P.1, which is bound to a nitrogen atom of the polyalkyleneimine backbone via a carboxamide or a carboximide group; and
c) at least one aliphatic polyether moiety P.2, which is bound to a nitrogen atom of the polyalkyleneimine backbone.

Within the context of the presently claimed invention, the term "alkyl", as used herein, refers to an acylic saturated aliphatic group, including linear or branched alkyl saturated hydrocarbon radicals, denoted by a general formula $C_nH_{2n+1}$ and wherein n is the number of carbon atoms such as 1, 2, 3, 4, etc.

The term "aryl", as used herein, refers to mono- or polycyclic, optionally substituted aromatic radicals having 6 to 20 ring carbon atoms. The term "heteroaryl" refers to "aryl" groups as described above and containing 1, 2, 3, 4, 5 or 6 heteroatom(s), such as N or O. The term "alkylaryl" refers to alkyl-substituted analogs of the above "aryl" groups.

In a preferred embodiment of the presently claimed invention, the polyalkyleneimine backbone has a weight average molecular weight in the range of 100 g/mol to 20,000 g/mol, as determined according to DIN 55672-1.

In a more preferred embodiment of the presently claimed invention, the polyalkyleneimine backbone has a weight average molecular weight in the range of 300 g/mol to 10,000 g/mol, as determined according to DIN 55672-1.

In an even more preferred embodiment of the presently claimed invention, the polyalkyleneimine backbone has a weight average molecular weight in the range of 500 g/mol to 5000 g/mol, as determined according to DIN 55672-1.

In a most preferred embodiment of the presently claimed invention, the polyalkyleneimine backbone has a weight average molecular weight in the range of from 500 g/mol to 2500 g/mol, as determined according to DIN 55672-1.

In a preferred embodiment of the presently claimed invention, the polyalkyleneimine backbone is a polyethyleneimine backbone.

In a particularly preferred embodiment of the presently claimed invention, the polyethyleneimine backbone has a weight average molecular weight of 800 g/mol, as determined according to DIN 55672-1.

In another particularly preferred embodiment of the presently claimed invention, the polyethyleneimine backbone has a weight average molecular weight of 2,000 g/mol, as determined according to DIN 55672-1.

In a preferred embodiment of the presently claimed invention, the at least one aromatic moiety P.1 is selected from the moieties of the formulae (P.1') and (P.1"), (P.1')

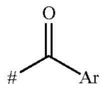

(P.1")

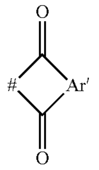

wherein # indicates the point of attachment of the aromatic moiety P.1 to a nitrogen atom of the polyalkyleneimine backbone;

Ar is selected from the group consisting of phenyl and naphthyl, wherein phenyl and naphthyl, each independently, are unsubstituted or substituted by 1, 2, 3, 4 or 5 radicals, which are selected from the group consisting of halogen, OH, $C_1$-$C_4$-alkyl, $C_1$-$C_4$-alkoxy, C(═O)—OH, C(═O)—$NH_2$, $NH_2$, $NO_2$, NH—C(═O)—H, NH—$C_1$-$C_4$-alkyl and NH—C(═O)—$C_1$-$C_4$-alkyl; and Ar' is selected from the group consisting of 1,2-phenylene, 1,2-, 2,3-, or 1,8-naphthylene, wherein phenylene and naphthylene, each independently, are unsubstituted or substituted by 1, 2, 3, 4 or 5 radicals, which are selected from the group consisting of halogen, OH, $C_1$-$C_4$-alkyl, $C_1$-$C_4$-alkoxy, C(═O)—OH, C(═O)—$NH_2$, $NO_2$, $NH_2$, NH—C(═O)—H, NH—$C_1$-$C_4$-alkyl, and NH—C(═O)—$C_1$-$C_4$-alkyl.

In a preferred embodiment of the presently claimed invention, the at least one aromatic moiety P.1 is selected from the group consisting of moieties of formulae (P.1a), (P.1b), (P.1c), (P.1d), and (P.1e), (P.1a)

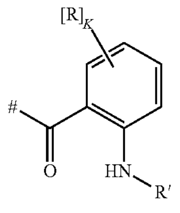

(P.1b)

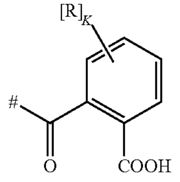

-continued (P.1c)

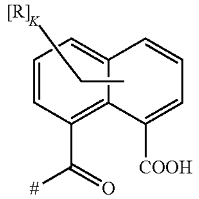

(P.1d)

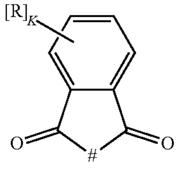

(P.1e)

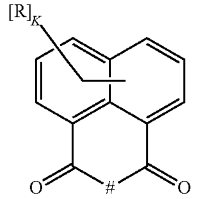

wherein # indicates the point of attachment of the aromatic moiety to a nitrogen atom of the polyalkyleneimine backbone;

R' is selected from the group consisting of hydrogen, $C_1$-$C_4$-alkyl, —(C═O)—H and —C(═O)—$C_1$-$C_4$-alkyl;

k is 0, 1, 2, 3 or 4; and

R is, identical or different, a radical selected from the group consisting of halogen, OH, $NO_2$, $C_1$-$C_4$ alkyl, $C_1$-$C_4$-alkoxy, C(═O)—$NH_2$, NH—C(═O)—H, NH—$C_1$-$C_4$-alkyl and NH—C(═O)—$C_1$-$C_4$-alkyl.

In a particularly preferred embodiment of the presently claimed invention, the at least one aromatic moiety P.1 is a moiety of formula (P.1a) having R' as H, and k=0.

In another particularly preferred embodiment of the presently claimed invention, the at least one aromatic moiety P.1 of is a moiety formula (P.1b) having k=0.

In another particularly preferred embodiment of the presently claimed invention, the at least one aromatic moiety P.1 is a moiety of formula (P.1c) having k=0.

In yet another particularly preferred embodiment of the presently claimed invention, the at least one aromatic moiety P.1 is a moiety of formula (P.1e) having k=0.

In a preferred embodiment of the presently claimed invention, the at least one aliphatic polyether moiety P.2 is a radical of the formula (P.2a)

(P.2a)

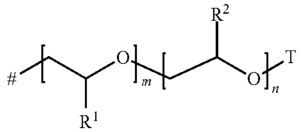

wherein, # indicates the point of attachment to a nitrogen atom of the polyalkyleneimine backbone;

$R^1$ and $R^2$ are each independently selected from the group consisting of hydrogen and $C_1$-$C_2$-alkyl;

m is an integer from 0 to 100;

n is an integer from 0 to 100;

m+n is an integer from 2 to 150; and

T is hydrogen, $C_1$-$C_{20}$-alkyl, $C_2$-$C_{20}$-alkenyl, C(═O)—$C_2$-$C_{20}$-alkenyl or C(═O)—$C_1$-$C_{20}$-alkyl, wherein $C_2$-$C_{20}$-alkenyl has 1, 2, 3 or 4 olefinic C═C-double bonds, and wherein 1, 2, 3, or 4 non-adjacent $CH_2$ groups of $C_1$-$C_{20}$-alkyl may be replaced by 0.

In a preferred embodiment of the presently claimed invention, m is an integer from 0 to 50;

n is an integer from 0 to 50; and m+n is an integer from 2 to 100.

In a preferred embodiment of the presently claimed invention, $R^1$ is H, m is an integer from 2 to 100;

n is 0; and

T is H.

In a preferred embodiment of the presently claimed invention, $R^1$ is $CH_3$, m is an integer from 2 to 100;

n is 0; and

T is H.

In a preferred embodiment of the presently claimed invention, $R^1$ is H, m is an integer from 1 to 100;

$R^2$ is $CH_3$, n is an integer 1 to 100;

m+n is an integer from 2 to 150 and

T is H.

In a preferred embodiment of the presently claimed invention, the “m” repeating units and the “n” repeating units form a gradient, a random or a block polymer structure.

In a particularly preferred embodiment of the presently claimed invention, the “m” repeating units and the “n” repeating units form a block polymer structure.

In another preferred embodiment of the presently claimed invention, the “m” repeating units and the “n” repeating units form a random polymer structure.

In a preferred embodiment of the presently claimed invention, the polymer comprises a) from 0.5 to 25 wt. % of the polyalkyleneimine backbone, based on the total weight of the polymer;
b) from 0.5 to 25 wt. % of the at least one aromatic moiety P.1, based on the total weight of the polymer; and
c) from 50 to 99 wt. % by of the at least one aliphatic polyether moiety P.2, based on the total weight of the polymer.

In a more preferred embodiment of the presently claimed invention, the polymer comprises a) from 1 to 15 wt. % of the polyalkyleneimine backbone, based on the total weight of the polymer;
b) from 1 to 15 wt. % of the at least one aromatic moiety P.1, based on the total weight of the polymer; and
c) from 70 to 98 wt. % by of the at least one aliphatic polyether moiety P.2, based on the total weight of the polymer.

In an even more embodiment of the presently claimed invention, the polymer comprises a) from 1 to 10 wt. % of the polyalkyleneimine backbone, based on the total weight of the polymer;
b) from 1 to 10 wt. % of the at least one aromatic moiety P.1, based on the total weight of the polymer; and
c) from 80 to 98 wt. % by of the at least one aliphatic polyether moiety P.2, based on the total weight of the polymer.

In a most preferred embodiment of the presently claimed invention, the polymer comprises a) from 2 to 10 wt. % of the polyalkyleneimine backbone, based on the total weight of the polymer;
b) from 2 to 10 wt. % of the at least one aromatic moiety P.1, based on the total weight of the polymer; and
c) from 80 to 96 wt. % by of the at least one aliphatic polyether moiety P.2, based on the total weight of the polymer.

In a preferred embodiment of the presently claimed invention, the polyalkyleneimine backbone further has protonated or quaternized amino groups, wherein the amino group is bound to a $R^4$ and an anion $X^-$.

In a preferred embodiment of the presently claimed invention, the $R^4$ is selected from the group consisting of hydrogen, $C_1$-$C_{24}$ alkyl, $C_4$-$C_{10}$ cycloalkyl, $C_6$-$C_{18}$ aryl, $C_7$-$C_{18}$ arylalkyl; and $X^-$ is selected from the group consisting of CL Br, I, acetate and benzoate.

In a preferred embodiment of the presently claimed invention, $R^4$ is selected from the group consisting of $—CH_2CH(OH)CH_2—O—CH_2CH(C_2H_5)CH_2CH_2CH_2CH_3$, $—CH_2$-phenyl and $—CH_2CH_3$, wherein phenyl is unsubstituted or substituted by 1, 2 or 3 radicals selected from the group consisting of chloride, bromide, hydroxy, $NO_2$ and methoxy.

In a particularly preferred embodiment of the presently claimed invention, $R^4$ is 4-chlorobenzyl.

In a particularly preferred embodiment of the presently claimed invention, $R^4$ is $—CH_2CH_3$.

In a particularly preferred embodiment of the presently claimed invention, $R^4$ is $—CH_2CH(OH)CH_2—O—CH_2CH(C_2H_5)CH_2CH_2CH_2CH_3$.

In a particularly preferred embodiment of the presently claimed invention, $X^-$ is Cl.

In a particularly preferred embodiment of the presently claimed invention, $X^-$ is Br.

In a particularly preferred embodiment of the presently claimed invention, $X^-$ is benzoate.

In a preferred embodiment of the presently claimed invention, the polymer has an amine number in the range of 10 to 1000 mg KOH/g, as determined according to DIN 53176:2002-11.

In a more preferred embodiment of the presently claimed invention, the polymer has an amine number in the range of 10 to 500 mg KOH/g, as determined according to DIN 53176:2002-11.

In an even more embodiment of the presently claimed invention, the polymer has an amine number in the range of 15 to 200 mg KOH/g, as determined according to DIN 53176:2002-11.

In a most preferred embodiment of the presently claimed invention, the polymer has an amine number in the range of 20 to 150 mg KOH/g, as determined according to DIN 53176:2002-11.

In a particularly preferred embodiment of the presently claimed invention, the polymer has an amine number in the range of 25 to 100 mg KOH/g, as determined according to DIN 53176:2002-11.

In a preferred embodiment of the presently claimed invention, the polymer has a weight average molecular weight in the range of 1,000 g/mol to 100,000 g/mol as determined according to DIN 55672-1.

In a more preferred embodiment of the presently claimed invention, the polymer has a weight average molecular weight in the range of 2,000 g/mol to 50,000 g/mol as determined according to DIN 55672-1.

In an even more preferred embodiment of the presently claimed invention, the polymer has a weight average molecular weight in the range of 2,500 g/mol to 25,000 g/mol as determined according to DIN 55672-1.

In a most preferred embodiment of the presently claimed invention, the polymer has a weight average molecular weight in the range of 3,000 g/mol to 15,000 g/mol as determined according to DIN 55672-1.

In a preferred embodiment of the presently claimed invention, the polymer has a number average molecular weight in the range of 600 g/mol to 60,000 g/mol as determined according to DIN 55672-1.

In a more preferred embodiment of the presently claimed invention, the polymer has a number average molecular weight in the range of 1,000 g/mol to 30,000 g/mol as determined according to DIN 55672-1.

In a most preferred embodiment of the presently claimed invention, the polymer has a number average molecular weight in the range of 1,500 g/mol to 15,000 g/mol as determined according to DIN 55672-1.

In another aspect, the presently claimed invention provides a process for preparing the polymer of the presently claimed invention. The process comprises the following steps, i. A polyalkyleneimine is reacted with an aromatic carboxylic acid or with an amide or imide forming derivative of an aromatic carboxylic acid, in such an amount that theoretically at most 90%, based on the total amount of primary and secondary nitrogen atoms of the polyalkyleneimine can be consumed.

ii. The product of step (i) is reacted with a first alkylene oxide and optionally with a second alkylene oxide to obtain the polymer.

In a preferred embodiment of the presently claimed invention, the polyalkyleneimine is polyethyleneimine.

In a preferred embodiment of the presently claimed invention, the aromatic carboxylic acid is

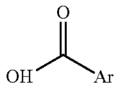

wherein Ar is selected from the group consisting of phenyl and naphthyl, wherein phenyl and naphthyl, each independently, are unsubstituted or substituted by 1, 2, 3, 4 or 5 radicals, which are selected from the group consisting of halogen, OH, $C_1$-$C_4$-alkyl, $C_1$-$C_4$-alkoxy, C(=O)—OH, C(=O)—$NH_2$, $NH_2$, $NO_2$, NH—C(=O)—H, NH—$C_1$-$C_4$-alkyl and NH—C(=O)—$C_1$-$C_4$-alkyl.

In a preferred embodiment of the presently claimed invention, the amide or imide forming derivative of an aromatic carboxylic acid is selected from compounds of formula (I), (I)

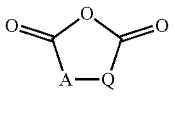

wherein

Q is a chemical bond or a divalent moiety selected from the group consisting of —O—, —NH— and —S—; and A is an unsubstituted or substituted aromatic group selected from the group consisting of the formula

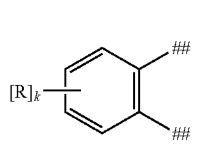

and

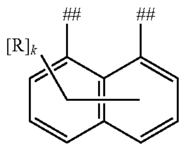

wherein ## indicates the point of attachment to the rest of the molecule;

k is 0, 1, 2, 3 or 4; and

R are, identical or different, a radical selected from the group consisting of halogen, OH, $NO_2$, $C_1$-$C_4$-alkyl, $C_1$-$C_4$-alkoxy, C(=O)—$NH_2$, NH—C(=O)—H, NH—$C_1$-$C_4$-alkyl, and NH—C(=O)—$C_1$-$C_4$-alkyl-C(=O)—.

In a preferred embodiment of the presently claimed invention, the compound of formula (I) has Q=NH and A is

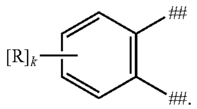

The compound of formula (I) is isatoic anhydride.

In a preferred embodiment of the presently claimed invention, the compound of formula (I) has Q as a direct bond. The compound of formula (I) is an aromatic carboxylic anhydride,

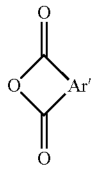

wherein Ar' is selected from the group consisting of 1,2-phenylene, 1,2-, 2,3-, or 1,8-naphthylene, wherein phenylene and naphthylene, each independently, are unsubstituted or substituted by 1, 2, 3, 4 or 5 radicals, which are selected from the group consisting of halogen, OH, $C_1$-$C_4$-alkyl, $C_1$-$C_4$-alkoxy, C(=O)—OH, C(=O)—$NH_2$, $NH_2$, $NO_2$, NH—C(=O)—H, NH—$C_1$-$C_4$-alkyl, and NH—C(=O)—$C_1$-$C_4$-alkyl.

In a more preferred embodiment of the presently claimed invention, the aromatic carboxylic anhydride is selected from the group consisting of moieties of formulae (P.1d') and (P.1e'), (P.1d')

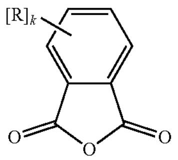

-continued (P.1e')

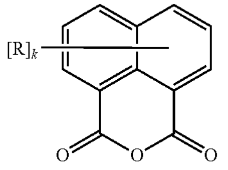

wherein, R and k are as defined earlier.

In a more preferred embodiment of the presently claimed invention, the at least one aromatic moiety is a moiety of formula (p.1e') having k=0.

In a preferred embodiment of the presently claimed invention, the ratio of the polyalkyleneimine to the aromatic carboxylic acid or the amide or imide forming derivative of an aromatic carboxylic acid is in the range of 5:1 to 1:5 by weight.

In a more preferred embodiment of the presently claimed invention, the ratio of the polyalkyleneimine to the aromatic carboxylic acid or the amide or imide forming derivative of an aromatic carboxylic acid is in the range of 3:1 to 1:3 by weight.

In a particularly preferred embodiment of the presently claimed invention, the ratio of the polyalkyleneimine to the aromatic carboxylic acid or the amide or imide forming derivative of an aromatic carboxylic acid is 1:1 by weight.

In another particularly preferred embodiment of the presently claimed invention, the ratio of the polyalkyleneimine to the aromatic carboxylic acid or the amide or imide forming derivative of an aromatic carboxylic acid is 2:1 by weight.

In another particularly preferred embodiment of the presently claimed invention, the ratio of the polyalkyleneimine to the aromatic carboxylic acid or the amide or imide forming derivative of an aromatic carboxylic acid is 5:3 by weight.

In another particularly preferred embodiment of the presently claimed invention, the ratio of the polyalkyleneimine to the aromatic carboxylic acid or the amide or imide forming derivative of an aromatic carboxylic acid is 2:3 by weight.

In a preferred embodiment of the presently claimed invention, the first alkylene oxide and second alkylene oxide are independently selected from the group consisting of ethylene oxide and propylene oxide.

In a particularly preferred embodiment of the presently claimed invention, the first alkylene oxide is ethylene oxide.

In another particularly preferred embodiment of the presently claimed invention, the first alkylene oxide is propylene oxide.

In yet another particularly preferred embodiment of the presently claimed invention, the first alkylene oxide is ethylene oxide and the second alkylene oxide is propylene oxide.

In a preferred embodiment of the presently claimed invention, the ratio of the product of step (i) and the amount of the first alkylene oxide is in the range from 1:1 to 1:100 by weight, and the ratio of the product of step (i) and the amount of the second alkylene oxide is in the range from 1:1 to 1:100 by weight.

In a more preferred embodiment of the presently claimed invention, the ratio of the product of step (i) and the amount of the first alkylene oxide is in the range from 1:1 to 1:50 by weight, and the ratio of the product of step (i) and the amount of the second alkylene oxide is in the range from 1:1 to 1:50 by weight.

In a most preferred embodiment of the presently claimed invention, the ratio of the product of step (i) and the amount of the first alkylene oxide is in the range from 1:1 to 1:25 by weight, and the ratio of the product of step (i) and the amount of the second alkylene oxide is in the range from 1:1 to 1:25 by weight.

In a particularly preferred embodiment of the presently claimed invention, the ratio of the product of step (i) and the amount of the first alkylene oxide is 3:20 by weight.

In another particularly preferred embodiment of the presently claimed invention, the ratio of the product of step (i) and the amount of the first alkylene oxide is 4:25 by weight.

In another particularly preferred embodiment of the presently claimed invention, the ratio of the product of step (i) and the amount of the first alkylene oxide is 1:10 by weight.

In a preferred embodiment of the presently claimed invention, step (ii) is carried out in the presence of a catalyst.

In a preferred embodiment of the presently claimed invention, step (ii) is carried out in the presence of a catalyst selected from the group consisting of alkali metal hydroxides and alkali metal alkoxides. Preferred alkali metal alkoxides are selected from the group consisting of sodium methoxide and potassium tert-butoxide.

In a preferred embodiment of the presently claimed invention, the process further comprises a step iii), wherein the product of step ii) is quaternized. The step of quaternizing involves heating a mixture comprising the product of step (ii) and an alkylating agent at a temperature in the range of 50 to 150° C.

In a preferred embodiment of the presently claimed invention, the alkylating agent is at least one alkylating agent selected from the group consisting of chlorobenzoyl chloride, ethyl bromide, and 2-ethylhexylglycidyl ether.

In a preferred embodiment of the presently claimed invention, the process further comprises a step iii), wherein the product of step ii) is protonated. The step of protonation involves heating a mixture comprising the product of step (ii) and an acid.

In yet another aspect, the presently claimed invention provides a liquid composition in the form of a dispersion comprising a particulate solid material selected from the group consisting of pigments and fillers, and a liquid diluent, wherein the particulate solid material is dispersed in the liquid diluent, further comprising a polymer of the presently claimed invention.

In another aspect, the presently claimed invention provides use of the polymer of the presently claimed invention as a component of a coating composition or an ink composition.

In a preferred embodiment of the presently claimed invention, the weight ratio of particulate solid material to the polymer is in the range from 100:1 to 1:2.

In a preferred embodiment of the presently claimed invention, the weight ratio of particulate solid material to the polymer is in the range from 100:1 to 1:2; more preferably in the range from 100:1 to 1:1; even more preferably from 100:1 to 10:1; and most preferably from 100:1 to 50:1.

In another preferred embodiment of the presently claimed invention, the weight ratio of particulate solid material to the polymer is in the range from 50:1 to 1:2; more preferably in the range from 10:1 to 2:1; and most preferably from 5:1 to 2:1.

In a preferred embodiment of the presently claimed invention, the size of the solid particulate material represented as the weight average particle diameter is in the range from 1 nm to 20000 nm; more preferably form 10 nm to 10000 nm; and most preferably from 20 nm to 500 nm. The weight average particle diameter may be determined by sieving analysis or by light scattering methods.

The pigments can be inorganic or organic.

In a preferred embodiment of the presently claimed invention, the organic pigments are pigments and pearlescent flakes selected from the group consisting of azo, disazo, naphthol, benzimidazolone, azocondensation, metal complex, isoindolinone, and isoindoline pigments, the chinophthalon pigment, dioxazine pigment and the polycyclic pigment selected from the group consisting of indigo, thioindigo, quinacridones, phthalocyanines, perylenes, perionones, anthraquinones, such as aminoanthraquinones or hydroxyanthraquinones, anthrapyrimidines, indanthrones, flavanthrones, pyranthrones, anthantrones, isoviolanthrones, diketopyrrolopyrrole, and carbazoles, e.g. carbazole violet, and the like. Further examples of organic pigments can be found in the monograph: W. Herbst, K. Hunger "*Industrielle Organische Pigmente*" 2nd Edition, 1995, VCH Verlagsgesellschaft, ISBN: 3-527-28744-2.

In a preferred embodiment of the presently claimed invention, the inorganic pigments are selected from the group consisting of metallic flakes, such as aluminum, Aluminium oxide, calcium carbonate, silicon oxide and silicates, iron(III)oxide, chromium(III)oxide, titanium(IV) oxide, zirconium(IV)oxide, zinc oxide, zinc sulphide, zinc phosphate, mixed metal oxide phosphates, molybdenum sulphide, cadmium sulphide, carbon black or graphite, vanadates, such as bismuth vanadate, chromates, such as lead (IV)chromate, and molybdates, such as lead(IV)molybdate, and mixtures, crystal forms or modifications thereof, such as ru-tile, anatase, mica, talcum, kaolin, and mixtures thereof.

In a preferred embodiment of the presently claimed invention, the pigment is carbon black and the weight average particle diameter of the pigment is in the range from 100 nm to 300 nm.

In a preferred embodiment of the presently claimed invention, the fillers are selected from the group consisting of calcium carbonate, silicates, glass fibers, glass beads, talc, kaolin, mica, barium sulphate, metal oxides and hydroxides, carbon black, graphite, wood powders, powders and fibers of other natural products, synthetic fibers and mixtures thereof.

The liquid diluent present in the dispersion will depend on the field of application.

For water-based formulations, the liquid diluent comprises water. The liquid diluent may further comprise polar, water-miscible solvents, such as $C_1$-$C_4$alkanols, e.g. methanol, ethanol, isopropanol, propanol or n-butanol, glycol ethers like butyl glycol, or methoxypropylene glycol, polyols, e.g. glycerol, ethyleneglycol, diethyleneglycol, triethylene, triethylene glycol, tripro-pylene glycol, propylene glycol or butyl diglycol; or mixtures thereof.

For solvent-based formulations, the liquid diluent is selected from low polarity solvents, such as aliphatic hydrocarbons, esters like butyl acetate, or glycol ethers like methoxypropylene glycol and glycol ether esters like methoxypropylene glycol acetate and mixtures thereof.

In a preferred embodiment of the presently claimed invention, the weight ratio of the fine particulate solid materials to the liquid diluent is in the range from 100:1 to 1:50; and more preferably in the range from 30:1 to 1:10.

The dispersion further comprises a binder and/or one or more additives depending on the intended use. The additives include but are not limited to plasticizers, lubricants, emulsifiers, humectants, rheology additives, catalysts, flow auxiliaries, optical brighteners, flame retardants, preservatives, antistatic agents and blowing agents.

In a preferred embodiment of the presently claimed invention, the dispersion is in the form of a millbase. The millbase comprises the fine particulate solid materials, the dispersant of formula (I), the liquid diluent and optionally additives, but generally millbase will not contain binders.

In a preferred embodiment of the presently claimed invention, the dispersion is in the form of a coating composition. The coating composition comprises the fine particulate solid materials, the dispersant of formula (I), the liquid diluent and additionally at least one binder, e.g. film-forming polymers or prepolymers which form a film upon curing. The coating composition further comprise additives conventionally used in coating technology, e.g. plasticizers, lubricants, emulsifiers, rheology additives, catalysts, flow auxiliaries, optical brighteners, flame retardants, preservatives, antistatic agents or blowing agents.

In a preferred embodiment of the presently claimed invention, the dispersion is in the form of an ink composition, e.g. a printing ink or a gravure ink. The ink composition comprises the fine particulate solid materials, the dispersant of formula (I), the liquid diluent and additionally at least one binder conventionally used in ink technology, e.g. film-forming polymers or prepolymers which form a film upon curing.

The presently claimed invention offers one or more of the following advantages:

1) The dispersants of the presently claimed invention provide stable dispersions with a high pigment loading.
2) The dispersions containing the dispersants of the presently claimed invention have a low viscosity. The viscosity of the dispersions is significantly reduced even at a high pigment loading.
3) The dispersants of the presently claimed invention enhance the rheology behavior of dispersions. Further, their rheology behavior does not change with time.
4) Surfaces coated with coating compositions comprising the dispersants of the presently claimed invention display a high gloss and a reduced crater number.

In the following, there is provided a list of embodiments to further illustrate the present disclosure without intending to limit the disclosure to the specific embodiments listed below.

1. A polymer having
   a) a polyalkyleneimine backbone;
   b) at least one aromatic moiety P.1, which is bound to a nitrogen atom of the polyalkyleneimine backbone via a carboxamide or a carboximide group; and
   c) at least one aliphatic polyether moiety P.2, which is bound to a nitrogen atom of the polyalkyleneimine backbone.
2. The polymer according to embodiment 1, wherein the polyalkyleneimine backbone has a weight average molecular weight in the range of 100 g/mol to 20,000 g/mol, as determined according to DIN 55672-1.
3. The polymer according to embodiment 1 or 2, wherein the polyalkyleneimine backbone is a polyethyleneimine backbone.
4. The polymer according to any of embodiments 1 to 3, wherein the at least one aromatic moiety P.1 is selected from the moieties of the formulae (P.1') and (P.1"), (P.1')

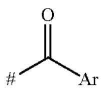

-continued (P.1″)

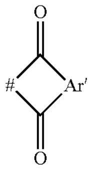

wherein # indicates the point of attachment of the aromatic moiety P.1 to a nitrogen atom of the polyalkyleneimine backbone;

Ar is selected from the group consisting of phenyl and naphthyl, wherein phenyl and naphthyl, each independently, are unsubstituted or substituted by 1, 2, 3, 4 or 5 radicals, which are selected from the group consisting of halogen, OH, $C_1$-$C_4$-alkyl, $C_1$-$C_4$-alkoxy, C(═O)—OH, C(═O)—$NH_2$, $NH_2$, $NO_2$, NH—C(═O)—H, NH—$C_1$-$C_4$-alkyl and NH—C(═O)—$C_1$-$C_4$-alkyl; and Ar' is selected from the group consisting of 1,2-phenylene, 1,2-, 2,3-, or 1,8-naphthylene, wherein phenylene and naphthylene, each independently, are unsubstituted or substituted by 1, 2, 3, 4 or 5 radicals, which are selected from the group consisting of halogen, OH, $C_1$-$C_4$-alkyl, $C_1$-$C_4$-alkoxy, C(═O)—OH, C(═O)—$NH_2$, $NO_2$, $NH_2$, NH—C(═O)—H, NH—$C_1$-$C_4$-alkyl, and NH—C(═O)—$C_1$-$C_4$-alkyl.

5. The polymer according to any of embodiments 1 to 4, wherein the at least one aromatic moiety P.1 is selected from the group consisting of moieties of formulae (P.1a), (P.1b), (P.1c), (P.1d), and (P.1e).

(P.1a)

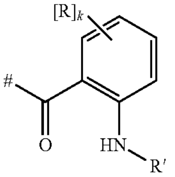

(P.1b)

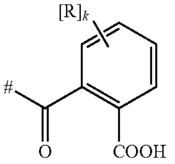

(P.1c)

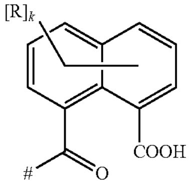

(P.1d)

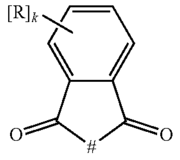

-continued (P.1e)

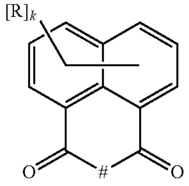

wherein # indicates the point of attachment of the aromatic moiety to a nitrogen atom of the polyalkyleneimine backbone;

R' is selected from the group consisting of hydrogen, $C_1$-$C_4$-alkyl, —(C═O)—H and —C(═O)—$C_1$-$C_4$-alkyl;

k is 0, 1, 2, 3 or 4; and

R is, identical or different, a radical selected from the group consisting of halogen, OH, $NO_2$, $C_1$-$C_4$-alkyl, $C_1$-$C_4$-alkoxy, C(═O)—$NH_2$, NH—C(═O)—H, NH—$C_1$-$C_4$-alkyl, and NH—C(═O)—$C_1$-$C_4$-alkyl.

6. The polymer according to any of embodiments 1 to 5, wherein the at least one aliphatic polyether moiety P.2 is a radical of the formula (P.2a)

(P.2a)

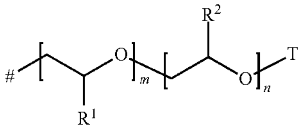

wherein, # indicates the point of attachment to a nitrogen atom of the polyalkyleneimine backbone;

$R^1$ and $R^2$ are each independently selected from the group consisting of hydrogen and $C_1$-$C_2$-alkyl;

m is an integer from 0 to 100;

n is an integer from 0 to 100;

m+n is an integer from 2 to 150; and

T is hydrogen, $C_1$-$C_{20}$-alkyl, $C_2$-$C_{20}$-alkenyl, C(═O)—$C_2$-$C_{20}$-alkenyl or C(═O)—$C_1$-$C_{20}$-alkyl, wherein $C_2$-$C_{20}$-alkenyl has 1, 2, 3 or 4 olefinic C═C-double bonds, and wherein 1, 2, 3, or 4 non-adjacent $CH_2$ groups of $C_1$-$C_{20}$-alkyl may be replaced by 0.

7. The polymer according to embodiment 6, wherein
m is an integer from 0 to 50;
n is an integer from 0 to 50; and
m+n is an integer from 2 to 100.

8. The polymer according to embodiment 6, wherein
$R^1$ is H, m is an integer from 2 to 100;
n is 0; and
T is H.

9. The polymer according to embodiment 6, wherein
$R^1$ is H, m is an integer from 1 to 100;
$R^2$ is —$CH_3$, n is an integer 1 to 100;
m+n is an integer from 2 to 150 and
T is H.

10. The polymer according to any of embodiments 6 to 9, wherein the "m" repeating units and the "n" repeating units form a gradient, a random or a block polymer structure.

11. The polymer according to any of embodiments 1 to 10 comprising
  a) from 0.5 to 25 wt. % of the polyalkyleneimine backbone, based on the total weight of the polymer;
  b) from 0.5 to 25 wt. % of the at least one aromatic moiety P.1, based on the total weight of the polymer; and
  c) from 50 to 99 wt. % by of the at least one aliphatic polyether moiety P.2, based on the total weight of the polymer.
12. The polymer according to any of embodiments 1 to 11, wherein the polyalkyleneimine backbone further has protonated or quaternized amino groups, wherein the amino group is bound to a $R^4$ and an anion $X^-$.
13. The polymer according to embodiment 12, wherein $R^4$ is selected from the group consisting of hydrogen, $C_1$-$C_{24}$ alkyl, $C_4$-$C_{10}$ cycloalkyl, $C_6$-$C_{18}$ aryl, $C_7$-$C_{18}$ arylalkyl; and $X^-$ is selected from the group consisting of Cl, Br, I, acetate and benzoate.
14. The polymer according to embodiment 12 or 13, wherein $R^4$ is selected from the group consisting of $—CH_2CH(OH)CH_2—O—CH_2CH(C_2H_5)CH_2CH_2CH_2CH_3$, $—CH_2$-phenyl and $—CH_2CH_3$, wherein phenyl is unsubstituted or substituted by 1, 2 or 3 radicals selected from the group consisting of chloride, bromide, hydroxy, $NO_2$ and methoxy.
15. The polymer according to any of embodiments 1 to 14, wherein the polymer has an amine number in the range of 10 to 1000 mg KOH/g, as determined according to DIN 53176:2002-11.
16. The polymer according to any of embodiments 1 to 15, wherein the polymer has a weight average molecular weight in the range of 1,000 g/mol to 100,000 g/mol as determined according to DIN 55672-1.
17. A process for preparing the polymer according to any of embodiments 1 to 16, comprising the following steps,
  i. reacting a polyalkyleneimine with an aromatic carboxylic acid or with an amide or imide forming derivative of an aromatic carboxylic acid, in such an amount that theoretically at most 90%, based on the total amount of primary and secondary nitrogen atoms of the polyalkyleneimine can be consumed, and
  ii. reacting the product of step (i) with a first alkylene oxide and optionally with a second alkylene oxide to obtain the polymer.
18. The process according to embodiment 17, wherein the amide or imide forming derivative of an aromatic carboxylic acid is selected from compounds of formula (I), (I)

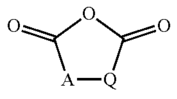

wherein

Q is a chemical bond or a divalent moiety selected from the group consisting of —O—, —NH— and —S—; and A is an unsubstituted or substituted aromatic group selected from the group consisting of the formula

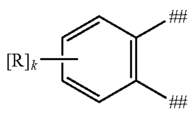

and

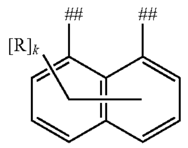

wherein ## indicates the point of attachment to the rest of the molecule;

k is 0, 1, 2, 3 or 4; and

R are, identical or different, a radical selected from the group consisting of halogen, OH, $NO_2$, $C_1$-$C_4$-alkyl, $C_1$-$C_4$-alkoxy, $C(═O)—NH_2$, NH—C(═O)—H, NH—$C_1$-$C_4$-alkyl, and NH—C(═O)—$C_1$-$C_4$-alkyl-C(═O)—.

19. The process according to embodiment 17 or 18, wherein the first alkylene oxide and second alkylene oxide are independently selected from the group consisting of ethylene oxide and propylene oxide.
20. The process according to any of embodiments 17 to 19, wherein the ratio of the polyalkyleneimine to the aromatic carboxylic acid or the amide or imide forming derivative of an aromatic carboxylic acid is in the range of 5:1 to 1:5 by weight.
21. The process according to any of embodiments 17 to 20, wherein the ratio of the product of step (i) and the amount of first alkylene oxide is in the range from 1:1 to 1:100 by weight, and the ratio of the product of step (i) and the amount of second alkylene oxide is in the range from 1:1 to 1:100 by weight.
22. The process according to any of embodiments 17 to 21 further comprising a step iii), wherein the product of step ii) is quaternized; wherein the step of quaternizing involves heating a mixture comprising the product of step (ii) and an alkylating agent at a temperature in the range of 50 to 150° C.
23. The process according to embodiment 22, wherein the alkylating agent is at least one selected from the group consisting of chlorobenzoyl chloride, ethyl bromide, and 2-ethylhexylglycidyl ether.
24. The process according to any of embodiments 17 to 21 further comprising a step iii), wherein the product of step ii) is protonated; wherein the step of protonation involves heating a mixture comprising the product of step (ii) and an acid.
25. A liquid composition in the form of a dispersion comprising a particulate solid material selected from the group consisting of pigments and fillers, and a liquid diluent, wherein the particulate solid material is dispersed in the liquid diluent, further comprising a polymer according to any of embodiments 1 to 16.
26. The liquid composition according to embodiment 25, wherein the weight ratio of particulate solid material to the polymer is in the range from 100:1 to 1:2.
27. Use of the polymer according to any of embodiments 1 to 16 as a component of a coating composition or an ink composition.

While the presently claimed invention has been described in terms of its specific embodiments, certain modifications and equivalents will be apparent to those skilled in the art and are intended to be included within the scope of the presently claimed invention.

EXAMPLES

The presently claimed invention is illustrated in detail by non-restrictive working examples which follow. More particularly, the test methods specified hereinafter are part of the general disclosure of the application and are not restricted to the specific working examples.

Materials

- Lupasol® PR 8515—Polyethyleneimine with an average molecular weight of 2000 g/mol as determined according to DIN 55672-1;
- Lupasol® FG —Polyethyleneimine with an average molecular weight 800 g/mol as determined according to DIN 55672-1;
- Hydropalat® WE3221—Silicone surfactant;
- Rheovis® PU 1214—Polyurethane-based associative thickener;
- Foamaster® ED2522—Ultra-low SVOC silicone emulsion defoamer;
- EFKA® 2550—Defoamer in various water-based coating systems and pigment concentrates; and all of which are available from BASF SE.

- Carbon Black FW171—Amorphous carbon black is available from Orion Engineered Carbons GmbH.
- Aberdingk® U 6150—Aliphatic polyurethane dispersion is available from Alberdingk Boley GmbH.
- DOWANOL™ DPnB—Dipropylene glycol n-butyl ether is available from Dow Chemicals.

Methods

- Acid number: The acid number was determined according to DIN 53402:1990-09.
- Amine number: The amine number was determined according to DIN 53176:2002-11.
- Molecular weight: The Mw was determined according to DIN 55672-1.
- Viscosity: The viscosity was determined by analogy to DIN 53019-1:2008-09, using a Thermo-Haake RheoStress 600 equipment under the CR mode at 22° C. and a shear rate of 1 $sec^{-1}$ (Spindle CP50).

A) Preparation of the Dispersants i) Preparation of Intermediates

Intermediate A1:

A mixture of 50 g Lupasol® FG (polyethyleneimine, MW of 800 g/mol) and 50 g 1,8-naphthalic anhydride was stirred at 130° C. under nitrogen atmosphere until the acid number of the mixture was less than 5 mg KOH/g. The mixture was cooled to obtain Intermediate A1 having an amine number of 400 mg KOH/g.

Intermediate A2:

A mixture of 50 g Lupasol® PR8515 (polyethyleneimine, MW of 2000 g/mol) and 25 g 1,8-naphthalic anhydride was stirred at 130° C. under nitrogen atmosphere until the acid number of the mixture was less than 5 mg KOH/g. The mixture was cooled to obtain Intermediate A2 having an amine number of 700 mg KOH/g.

Intermediate A3:

A mixture of 50 g Lupasol® FG (polyethyleneimine, MW of 800 g/mol) and 30 g isatoic anhydride was stirred at room temperature for 1 h followed by slowly increasing the temperature of the mixture to 60° C. The resultant mixture was stirred at 60° C. until release of carbon di-oxide ceased. The mixture was cooled to obtain Intermediate A3 having an amine number of 860 mg KOH/g.

Intermediate A4:

A mixture of 50 g Lupasol® FG (polyethyleneimine, MW of 800 g/mol) and 75 g 1,8-naphthalic anhydride was stirred at 130° C. under nitrogen atmosphere until the acid number of the mixture was less than 5 mg KOH/g. The mixture was cooled to obtain Intermediate A4 having an amine number of 330 mg KOH/g.

ii) Preparation of Dispersants from the Intermediates Prepared in Step (i)

Example 1: Preparation of Dispersant 1

In a 2 L autoclave equipped with heating system, cooling system, an agitator, a gas inlet and an ethylene oxide tank, were introduced 150 g of Intermediate A1 and 2 g KOtBu. The autoclave was purged with nitrogen followed by heating the mixture to 110° C. The mixture was dehydrated at a pressure of 10 mbar for 1 h. The resultant mixture was heated to 120° C. and 1 kg ethylene oxide was introduced into the autoclave over next 12 h. The reaction mixture was heated until the pressure in the autoclave remained constant. Volatiles, including by-products and residual monomers, were removed under vacuum to obtain 1130 g of Dispersant 1 having an amine number of 50 mg KOH/g, GPC(THF): Mw=6500 g/mol, Mn=4500 g/mol, and PDI=1.44.

Example 2: Preparation of Dispersant 2

In a 2 L autoclave equipped with heating system, cooling system, an agitator, a gas inlet and an ethylene oxide tank, were introduced 80 g of Intermediate A2 and 1 g KOtBu. The autoclave was purged with nitrogen followed by heating the mixture to 110° C. The mixture was dehydrated at a pressure of 10 mbar for 1 h. The resultant mixture was heated to 120° C. and 500 g ethylene oxide was introduced into the autoclave over next 12 h. The reaction mixture was heated until the pressure in the autoclave remained constant. Volatiles, including by-products and residual monomers, were removed under vacuum to obtain 560 g of Dispersant 2 having an amine number of 90 mg KOH/g, GPC(THF): Mw=7500 g/mol, Mn=5050 g/mol, and PDI=1.48.

Example 3: Preparation of Dispersant 3

In a 2 L autoclave equipped with heating system, cooling system, an agitator, a gas inlet and an ethylene oxide tank, were introduced 80 g of Intermediate A3 and 1.7 g KOtBu. The autoclave was purged with nitrogen followed by heating the mixture to 110° C. The mixture was dehydrated at a pressure of 10 mbar for 1 h. The resultant mixture was heated to 120° C. and 800 g ethylene oxide was introduced into the autoclave over next 12 h. The reaction mixture was heated until the pressure in the autoclave remained constant. Volatiles, including by-products and residual monomers, were removed under vacuum to obtain 850 g of the Dispersant 3 having an amine number of 86 mg KOH/g, GPC (THF): Mw=4500 g/mol, Mn=3100 g/mol, and PDI=1.45.

Example 4: Preparation of Dispersant 4

In a 2 L autoclave equipped with heating system, cooling system, an agitator, a gas inlet and an ethylene oxide tank and a propylene oxide tank, were introduced 150 g of Intermediate A1 and 2 g KOtBu. The autoclave was purged with nitrogen followed by heating the mixture to 110° C. The mixture was dehydrated at a pressure of 10 mbar for 1 h. The resultant mixture was heated to 120° C. and 1 kg ethylene oxide was introduced into the autoclave over next 12 h. The reaction mixture was heated until the pressure in the autoclave remained constant. The temperature of the reaction mixture was raised to 130° C., and 300 g of propylene oxide was introduced into the autoclave over 12 h. The reaction mixture was heated until the pressure in the autoclave remained constant. Volatiles, including by-products and residual monomers, were removed under vacuum to obtain 940 g of Dispersant 4 having an amine number of 51 mg KOH/g, GPC(THF): Mw=10500 g/mol, Mn=7050 g/mol, and PDI=1.49.

Example 5: Preparation of Dispersant 5

In a 2 L autoclave equipped with heating system, cooling system, an agitator, a gas inlet and an ethylene oxide tank and a propylene oxide tank, were introduced 150 g of Intermediate A1 and 2 g KOtBu. The autoclave was purged with nitrogen followed by heating the mixture to 110° C. The mixture was dehydrated at a pressure of 10 mbar for 1 h. The resultant mixture was heated to 130° C. and 200 g propylene oxide was introduced into the autoclave over 12 h. The reaction mixture was heated until the pressure in the autoclave remained constant. The temperature of the reaction mixture was reduced to 120° C., and 800 g ethylene oxide was introduced into the autoclave over 12 h. The reaction mixture was heated until the pressure in the autoclave remained constant. Volatiles, including by-products and residual monomers, were removed under vacuum to obtain 1130 g of Dispersant 5 having an amine number of 48 mg KOH/g, GPC(THF): Mw=8500 g/mol, Mn=4500 g/mol, and PDI=1.89.

Example 6: Preparation of Dispersant 6

In a 2 L autoclave equipped with heating system, cooling system, an agitator, a gas inlet and an ethylene oxide tank and a propylene oxide tank, were introduced 80 g of Intermediate A3 and 2 g KOtBu. The autoclave was purged with nitrogen followed by heating the mixture to 110° C. The mixture was dehydrated at a pressure of 10 mbar for 1 h. The resultant mixture was heated to 130° C., and 200 g of propylene oxide and 800 g of ethylene oxide were introduced into the autoclave over 12 h. The reaction mixture was heated until the pressure in the autoclave remained constant. Volatiles, including by-products and residual monomers, were removed under vacuum to obtain 1060 g of Dispersant 6 having an amine number of 63 mg KOH/g, GPC(THF): Mw=7900 g/mol, Mn=5100 g/mol, and PDI=1.55.

Example 7: Preparation of Dispersant 7

In a 2 L autoclave equipped with heating system, cooling system, an agitator, a gas inlet and an ethylene oxide tank, were introduced 150 g of Intermediate A1 and 2 g KOtBu. The autoclave was purged with nitrogen followed by heating the mixture to 110° C. The mixture was dehydrated at a pressure of 10 mbar for 1 h. The resultant mixture was heated to 120° C. and 2 kg ethylene oxide was introduced into the autoclave over 12 h. The reaction mixture was heated until the pressure in the autoclave remained constant. Volatiles, including by-products and residual monomers, were removed under vacuum to obtain 2120 g of Dispersant 7 having an amine number of 29 mg KOH/g, GPC(THF): Mw=12800 g/mol, Mn=8900 g/mol, and PDI=1.44.

Example 8: Preparation of Dispersant 8

A mixture of 100 g Dispersant 2 and 13 g 2-chlorobenzylchloride was heated at 100° C. until the amine number of the mixture reached a constant value. 113 g of Dispersant 8 having an amine number of 41 mg KOH/g was obtained.

Example 9: Preparation of Dispersant 9

A mixture of 100 g Dispersant 2 and 9 g ethyl bromide was heated at 100° C. until the amine number of the mixture reached a constant value. 109 g of Dispersant 9 having an amine number of 40 mg KOH/g was obtained.

Example 10: Preparation of Dispersant 10

A mixture of 100 g Dispersant 2, 15 g 2-ethylhexyl glycidyl ether and 10 g benzoic acid was heated at 120° C. until the amine number of the mixture reached a constant value. 125 g of Dispersant 10 having an amine number of 35 mg KOH/g was obtained.

Comparative Example 1

In a 2 L autoclave equipped with heating system, cooling system, an agitator, a gas inlet and an ethylene oxide tank, were introduced 43 g of Lupasol® FG (polyethyleneimine, MW of 800 g/mol) and 2 g KOtBu. The autoclave was purged with nitrogen followed by heating the mixture to 110° C. The mixture was dehydrated at a pressure of 10 mbar for 1 h. The resultant mixture was heated to 120° C. and 1 kg ethylene oxide was introduced into the autoclave over 12 h. The reaction mixture was heated until the pressure in the autoclave remained constant. Volatiles, including by-products and residual monomers, were removed under vacuum to obtain 1020 g of the comparative polymer 1 having an amine number of 51 mg KOH/g, GPC(THF): Mw=7600 g/mol, Mn=4800 g/mol, and PDI=1.58.

Comparative Example 2

In a 2 L autoclave equipped with heating system, cooling system, an agitator, a gas inlet and an ethylene oxide tank, were introduced 43 g of Lupasol® PR8515 (polyethyleneimine, MW of 2000 g/mol) and 2 g KOtBu. The autoclave was purged with nitrogen followed by heating the mixture to 110° C. The mixture was dehydrated at a pressure of 10 mbar for 1 h. The resultant mixture was heated to 120° C. and 500 g ethylene oxide was introduced into the autoclave over 12 h. The reaction mixture was heated until the pressure in the autoclave remained constant. Volatiles, including by-products and residual monomers, were removed under vacuum to obtain 530 g of the comparative polymer 2 having an amine number of 102 mg KOH/g, GPC(THF): Mw=6700 g/mol, Mn=4200 g/mol, and PDI=1.59.

Performance Testing:

Step 1: Preparation of Millbase

In order to test the dispersion effect of the obtained dispersants, A resin free millbase (water-based pigment concentrate) having the composition according to Formulation 1 was prepared.

Formulation 1. Preparation of Pigment Concentrates

| Sr. | Component | Amount |
|---|---|---|
| 1 | Dispersants of present invention (100% solid) | 14.4 g |
| 2 | Water | 53.4 g |
| 3 | Tripropyleneglycol | 15 g |
| 4 | 2-Amino-2-methylpropanol | 1 g |
| 5 | Pigment: Carbon Black FW 255 | 16 g |
| 6 | EFKA ® 2550 | 0.2 g |
| 7 | 2.0 mm glass beads | 200 g |
| | Total | 300 g |

The milling step was carried out using a Scandex Shaker over 4 h with the help of glass beads to obtain a dispersion or millbase. The millbase was filtered and stored at 40° C. for 2 weeks.

The rheological behaviour of the millbase was evaluated with a Thermo-Haake RheoStress 600 equipment under the CR mode. The viscosity of the millbase was determined and the results are summarized in Table 1.

TABLE 1

| Millbase viscosity (Viscosity @ 1 $S^{-1}$) | |
|---|---|
| Example | mpas |
| Comparative example 1 | Very less millbase obtained, |
| Comparative example 2 | >100,000 mPa · s |
| 1 | 1250 |
| 2 | 800 |
| 5 | 750 |
| 8 | 1100 |
| 10 | 950 |

It is evident from Table 1 that the millbases prepared using the dispersants of the presently claimed invention have a low millbase viscosity. On the contrary, the millbases prepared using the comparative dispersants have a high viscosity.

Thus, the dispersants of the presently claimed invention provides a low viscosity millbase and coating composition for the same amount of pigment loading.

Step 2: Preparation of Paint Composition Using Millbase from Step 1

A paint composition was prepared by dispersing 2 g of millbase obtained in step-1 into 8 g let-down (Formulation 2) via Dispermat for 1 min at 1000 rpm.

Formulation 2. Preparation of Let Down

| Sr. | Component | Amount |
|---|---|---|
| 1 | Alberdingk ® U 6150 | 80 g |
| 2 | Water | 12.5 g |
| 3 | Foamstar ® ED 2522 | 0.8 g |
| 4 | Hydropalat ® WE3221 | 0.2 g |
| 5 | Dowanol ™ DPnB | 6 g |
| 6 | Rheovis ® PU 1214 | 0.5 g |
| | Total | 100 g |

The paint composition obtained in step 2 was applied on polyester film with a 75 μm film thickness and dried at 130° C. in oven for 30 min. The surface coating was evaluated, and the results are summarized in Table 2.

TABLE 2

| Gloss (80°) and crater ranking | | |
|---|---|---|
| Dispersant | Gloss | Crater* |
| Comparative example 1 | -70- | 5 |
| Comparative example 2 | -75- | 5 |
| 1 | 86 | 2 |
| 2 | 88 | 1 |
| 5 | 89 | 1 |
| 8 | 85 | 1 |
| 10 | 84 | 2 |

*1 means no crater and 5 means many craters

It is observed from Table 2 that the performance of the paint compositions prepared using the dispersants of the presently claimed invention was significantly better with respect to aesthetics and physical properties of surface coatings, which is evident from high quality film having satisfactory film properties, such as a high gloss and low crater ranking as compared to the paint compositions prepared using dispersant from comparative examples 1 and 2.

The invention claimed is:

1. A polymer having a) from 0.5 to 25 wt. % of a polyalkyleneimine backbone based on the total weight of the polymer;

b) from 0.5 to 25 wt. % of at least one aromatic moiety P.1, based on the total weight of the polymer, which is bound to a nitrogen atom of the polyalkyleneimine backbone via a carboxamide or a carboximide group; and c) from 50 to 99 wt. % of at least one aliphatic polyether moiety P.2, based on the total weight of the polymer, which is bound to a nitrogen atom of the polyalkyleneimine backbone, wherein the at least one aliphatic polyether moiety P.2 is a radical of the formula (P.2a)

(P.2a)

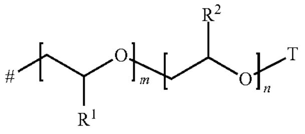

wherein, # indicates the point of attachment to a nitrogen atom of the polyalkyleneimine backbone;

$R^1$ and $R^2$ are each independently selected from the group consisting of hydrogen and $C_1$-$C_2$-alkyl;

m is an integer from 0 to 100;

n is an integer from 0 to 100;

m+n is an integer from 2 to 150; and

T is hydrogen, $C_1$-$C_{20}$-alkyl, $C_2$-$C_{20}$-alkenyl, C(═O)—$C_2$-$C_{20}$-alkenyl or C(═O)—$C_1$-$C_{20}$-alkyl, wherein $C_2$-$C_{20}$-alkenyl has 1,2, 3 or 4 olefinic C═C-double bonds, and wherein 1, 2, 3, or 4 non-adjacent $CH_2$ groups of $C_1$-$C_{20}$-alkyl may be replaced by O, and wherein the at least one aromatic moiety P.1 is selected from the moieties of the formulae (P.1') and (P.1"), (P.1')

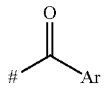

(P.1")

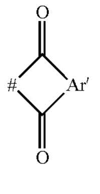

wherein # indicates the point of attachment of the aromatic moiety P.1 to a nitrogen atom of the polyalkyleneimine backbone;

Ar is selected from the group consisting of phenyl and naphthyl, wherein phenyl and naphthyl, each independently, are unsubstituted or substituted by 1, 2, 3, 4 or 5 radicals, which are selected from the group consisting of halogen, OH, $C_1$-$C_4$-alkyl, $C_1$-$C_4$-alkoxy, C(═O)—

OH, C(═O)—$NH_2$, $NH_2$, $NO_2$, NH—C(═O)—H, NH—$C_1$-$C_4$-alkyl and NH—C(═O)—$C_1$-$C_4$-alkyl; and Ar' is selected from the group consisting of 1,2-phenylene, 1,2-, 2,3-, or 1,8-naphthylene, wherein phenylene and naphthylene, each independently, are unsubstituted or substituted by 1, 2, 3, 4 or 5 radicals, which are selected from the group consisting of halogen, OH, $C_1$-$C_4$-alkyl, $C_1$-$C_4$-alkoxy, C(═O)—OH, C(═O)—$NH_2$, $NO_2$, $NH_2$, NH—C(═O)—H, NH—$C_1$-$C_4$-alkyl, and NH—C(═O)—$C_1$-$C_4$-alkyl.

2. The polymer according to claim 1, wherein the polyalkyleneimine backbone has a weight average molecular weight in the range of 100g/mol to 20,000 g/mol, as determined according to DIN 55672-1.

3. The polymer according to claim 1, wherein the at least one aromatic moiety P.1 is selected from the group consisting of moieties of formulae (P.1a), (P.1b), (P.1c), (P.1d), and (P.1e), (P.1a)

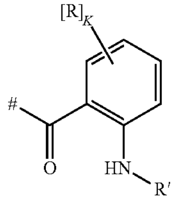

(P.1b)

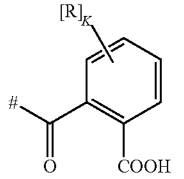

(P.1c)

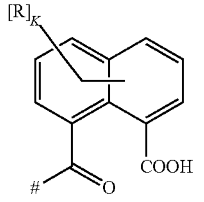

(P.1d)

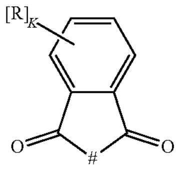

(P.1e)

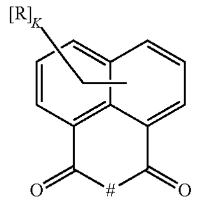

wherein

\# indicates the point of attachment of the aromatic moiety to a nitrogen atom of the polyalkyleneimine backbone;

R' is selected from the group consisting of hydrogen, $C_1$-$C_4$-alkyl, —(C═O)—H and —C(═O)—$C_1$-$C_4$-alkyl;

k is 0, 1, 2, 3 or 4; and

R is, identical or different, a radical selected from the group consisting of halogen, OH, $NO_2$, $C_1$-$C_4$-alkyl, $C_1$-$C_4$-alkoxy, C(═O)—$NH_2$, NH—C(═O)—H, NH—$C_1$-$C_4$-alkyl, and NH—C(═O)—$C_1$-$C_4$-alkyl.

4. The polymer according to claim 1, wherein the "m" repeating units and the "n" repeating units form a gradient, a random or a block polymer structure, when the "m" repeating units and the "n" repeating units are not 0.

5. The polymer according to claim 1, wherein the polyalkyleneimine backbone further has protonated or quaternized amino groups, wherein the amino group is bound to a $R^4$ and an anion $X^-$, wherein $R^4$ is selected from the group consisting of hydrogen, $C_1$-$C_{24}$ alkyl, $C_4$-$C_{10}$ cycloalkyl, $C_6$-$C_{18}$ aryl, and $C_7$-$C_{18}$ arylalkyl.

6. The polymer according to claim 1, wherein the polymer has an amine number in the range of 10 to 1000 mg KOH/g, as determined according to DIN 53176:2002-11.

7. The polymer according to claim 1, wherein the polymer has a weight average molecular weight in the range of 1,000 g/mol to 100,000 g/mol as determined according to DIN 55672-1.

8. A process for preparing the polymer according to claim 1, comprising the following steps, i. reacting a polyalkyleneimine with an aromatic carboxylic acid or with an amide or imide forming derivative of an aromatic carboxylic acid, in such an amount that theoretically at most 90%, based on the total amount of primary and secondary nitrogen atoms of the polyalkyleneimine, can be consumed, and ii. reacting the product of step (i) with a first alkylene oxide and optionally with a second alkylene oxide to obtain the polymer, wherein the aromatic carboxylic acid is

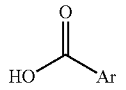

wherein Ar is selected from the group consisting of phenyl and naphthyl, wherein phenyl and naphthyl, each independently, are unsubstituted or substituted by 1, 2, 3, 4, or 5 radicals, which are selected from the group consisting of halogen, OH, $C_1$-$C_4$-alkyl, $C_1$-$C_4$-alkoxy, C(═O)—OH, C(═O)—$NH_2$, $NH_2$, $NO_2$, NH—C(═O)—H, NH—$C_1$-$C_4$-alkyl and NH—C(═O)—$C_1$-$C_4$-alkyl, and the amide or imide forming derivative of an aromatic carboxylic acid is selected from compounds of formula (I), (I)

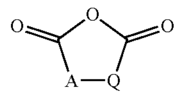

wherein

Q is a chemical bond or a divalent moiety selected from the group consisting of —O—, —NH— and —S—; and A is an unsubstituted or substituted aromatic group selected from the group consisting of the formula

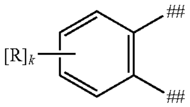
and
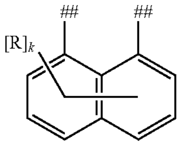

wherein ## indicates the point of attachment to the rest of the molecule;

k is 0, 1, 2, 3 or 4; and

R are, identical or different, a radical selected from the group consisting of halogen, OH, $NO_2$, $C_1$-$C_4$-alkyl, $C_1$-$C_4$-alkoxy, C(═O)—$NH_2$, NH—C(═O)—H, NH—$C_1$-$C_4$-alkyl, and NH—C(═O)—$C_1$-$C_4$-alkyl-C(═O)—.

9. The process according to claim 8, wherein the amide or imide forming derivative of an aromatic carboxylic acid is selected from compounds of formula (I), (I)

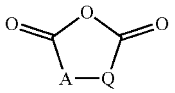

wherein

Q is a chemical bond or a divalent moiety selected from the group consisting of —O—, —NH— and —S—; and A is an unsubstituted or substituted aromatic group selected from the group consisting of the formula

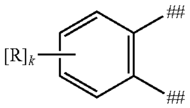
and
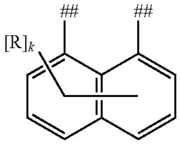

wherein ## indicates the point of attachment to the rest of the molecule;

k is 0, 1, 2, or 3; and

R are, identical or different, a radical selected from the group consisting of halogen, OH, $NO_2$, $C_1$-$C_4$-alkyl, $C_1$-$C_4$-alkoxy, C(═O)—$NH_2$, NH—C(═O)—H, NH—$C_1$-$C_4$-alkyl, and NH—C(═O)—$C_1$-$C_4$-alkyl-C(═O)—.

10. The process according to claim 8, wherein the first alkylene oxide and second alkylene oxide are independently selected from the group consisting of ethylene oxide and propylene oxide.

11. The process according to claim 8, wherein the ratio of the polyalkyleneimine to the aromatic carboxylic acid or the amide or imide forming derivative of an aromatic carboxylic acid is in the range of 5:1 to 1:5 by weight.

12. The process according to claim 8, wherein the ratio of the product of step (i) and the amount of first alkylene oxide is in the range from 1:1 to 1:100 by weight, and the ratio of the product of step (i) and the amount of second alkylene oxide is in the range from 1:1 to 1:100 by weight.

13. The process according to claim 8 further comprising a step iii), wherein the product of step ii) is quaternized; wherein the step of quaternizing involves heating a mixture comprising the product of step (ii) and an alkylating agent at a temperature in the range of 50 to 150° C.

14. A liquid composition in the form of a dispersion comprising a particulate solid material selected from the group consisting of pigments and fillers, and a liquid diluent, wherein the particulate solid material is dispersed in the liquid diluent, further comprising a polymer according to claim 1.

15. The liquid composition according to claim 14, wherein the weight ratio of particulate solid material to the polymer is in the range from 100:1 to 1:2.

16. A method of preparing a coating composition or an ink composition, the method comprising dispersing a particulate solid material selected from the group consisting of pigments and fillers in a liquid diluent in the presence of a polymer according to claim 1; and combining the resulting dispersion with at least one binder to form a coating composition or an ink composition.

* * * * *